(12) United States Patent
Bullard et al.

(10) Patent No.: US 10,716,311 B1
(45) Date of Patent: Jul. 21, 2020

(54) CONVEYOR SYSTEM AND RELATED METHODS OF PROCESSING FOOD

(71) Applicant: Zee Company, Inc., Chattanooga, TN (US)

(72) Inventors: Robert C. Bullard, Signal Mountain, TN (US); Jonathon R. Bullard, Chattanooga, TN (US); Battle Glascock, Soddy Daisy, TN (US); James A. Faller, Chattonooga, TN (US); William J. Guinn, Chattanooga, TN (US)

(73) Assignee: ZEE COMPANY, INC., Chattanooga, TN (US)

( * ) Notice: Subject to any disclaimer, the term of this patent is extended or adjusted under 35 U.S.C. 154(b) by 188 days.

(21) Appl. No.: 15/811,175

(22) Filed: Nov. 13, 2017

Related U.S. Application Data

(60) Provisional application No. 62/420,957, filed on Nov. 11, 2016.

(51) Int. Cl.
*A23B 4/30* (2006.01)
*B65G 15/60* (2006.01)
*B65G 15/22* (2006.01)
*A23B 4/20* (2006.01)
*A23P 20/18* (2016.01)

(52) U.S. Cl.
CPC .......... *A23B 4/30* (2013.01); *A23B 4/20* (2013.01); *B65G 15/22* (2013.01); *B65G 15/60* (2013.01); *A23P 20/18* (2016.08)

(58) Field of Classification Search
CPC .. A23B 4/30; A23B 4/20; B65G 15/22; B65G 15/60
See application file for complete search history.

(56) References Cited

U.S. PATENT DOCUMENTS

| | | | |
|---|---|---|---|
| 6,193,054 B1 * | 2/2001 | Henson | B65G 23/14 198/781.09 |
| 6,626,193 B1 * | 9/2003 | Arrieta | B08B 3/041 134/122 R |

* cited by examiner

*Primary Examiner* — Sean E Conley
(74) *Attorney, Agent, or Firm* — Patterson Thuente Pedersen, P.A.

(57) ABSTRACT

A conveyor system and related methods of operation for using two or more conveyors to treat at least two separate sides of food items with a chemical intervention solution. The conveyor system can include two or more conveyors arranged in an angled relationship relative to a horizontal plane such that a first side of a food material is presented on a first conveyor and a second side of the food material is presented on a second conveyor. A chemical intervention system including two or more spray assemblies can apply a suitable chemical intervention solution to the first and second sides of food. The two or more conveyors can be arranged at an angle from 20-45 degrees relative to a common horizontal plane.

20 Claims, 6 Drawing Sheets

CONVEYOR SYSTEM AND RELATED METHODS OF PROCESSING FOOD

CROSS-REFERENCE TO RELATED APPLICATION

The present application claims the benefit of U.S. Provisional Application No. 62/420,957, filed Nov. 11, 2016, which is hereby incorporated herein in its entirety by reference.

TECHNICAL FIELD

The present invention relates to a conveyor apparatus that can be used in the processing of materials such as food products. More particularly, the present invention includes at least two conveyors operating in an angled relation such that pieces of food can be fully treated on all sides with a chemical intervention solution.

BACKGROUND

The world population has grown to a point where mass production of the foods that we consume is no longer a luxury but a requirement. Local farmers, providing food and food products directly to the marketplace, cannot meet the demands of modern society. The food supply chain now incorporates very large, complex farms and high speed and very high volume processing plants to satisfy the need for mass processing and production of food. Maintaining a safe food supply chain relies on the dedication of those working in the supply chain, the processing plants and also on the third party oversight of various federal agencies whose regulations support and mandate food safety.

With two major exceptions, the physical process of taking an animal from the farm to the consumer has changed very little over time. The introduction of refrigeration, and the implementation of various chemistries to help maintain sanitary conditions and to control microbiology, has given modern food processors an advantage not enjoyed by food producers of a century ago. Refrigeration and chemical intervention practices have become an integral part of food processing facility operations. These technologies have enabled the high speed, high volume output of the large processing facilities that could not have been possible in times past without significant concern for consumer safety. With large scale and continuous processing methods being employed by large processors of protein food products, or any other material or food product that is susceptible to microbiological contamination, the concern for the control of microbiology and the safety of the food supply chain is of paramount importance.

As such, there exists a continuing need in the industry to efficiently, cost-effectively and safely process materials, such as protein food products, as well as systems for providing such processes.

SUMMARY

The present invention is directed at a conveyor system and methods of processing food materials, such as various types and cuts of meat, produce, eggs and the like, such that the entire food material is exposed to appropriate chemical intervention solutions.

In one aspect, a conveyor system of the present invention can utilize two or more conveyors arranged in an angled relationship relative to a horizontal plane such that a first side of a food material is presented on a first conveyor and a second side of the food material is presented on a second conveyor. The conveyor system can further comprise a chemical intervention system including two or more spray assemblies for applying a suitable chemical intervention solution to the first and second sides of food the food while on the first and second conveyors, respectively.

In some aspects, the two or more conveyors can be arranged at an angle from about 20 degrees to about 45 degrees relative to a common horizontal plane. In some aspects, the angled orientation of two or more conveyors can be such that the two or more conveyors are operated in a parallel relation to each other. The conveyor system can include a motor assembly including a belt assembly for simultaneously driving the two or more conveyors. In some embodiments, the two or more conveyors can be operated at the same speed or alternatively, the motor and belt assembly can comprise a gear assembly for operation at different speeds.

In another aspect, the present invention is directed to a method of treating food items with chemical intervention solutions. Generally, the method can comprise a step of conveying a food item along a first conveyor such that a first side is exposed or otherwise presented. The method can further comprise spraying the first side with a chemical intervention solution as the food item moves along the first conveyor. The method can further comprise transferring the food item to a second conveyor, wherein said transfer results in a second side of the food item being exposed or otherwise presented on the second conveyor. The method can further comprise spraying the second side with the chemical intervention solution as the food item moves along the second conveyor.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
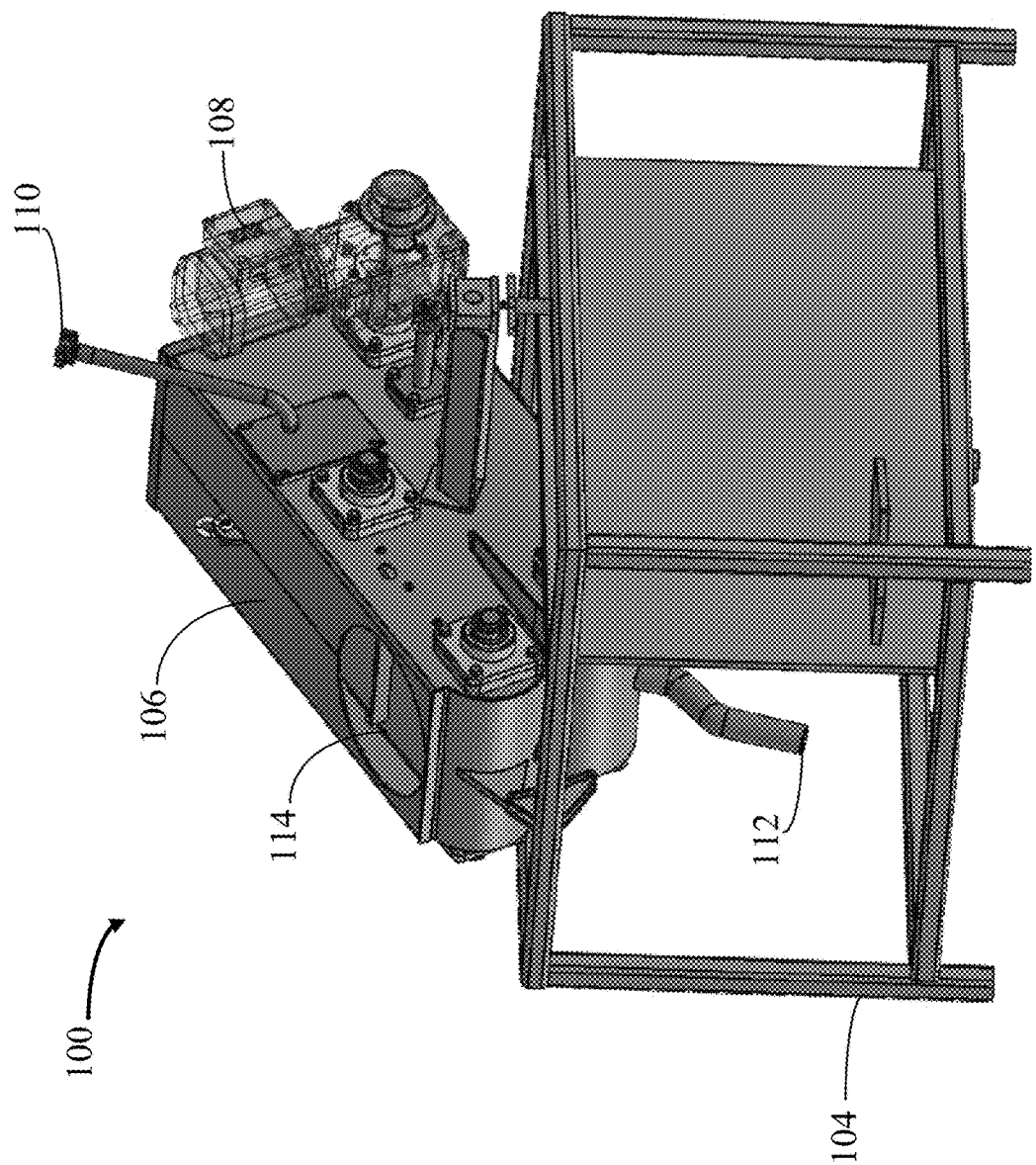
FIG. 1 is a perspective view an embodiment of a conveyor system of the present invention.
Figure 2:
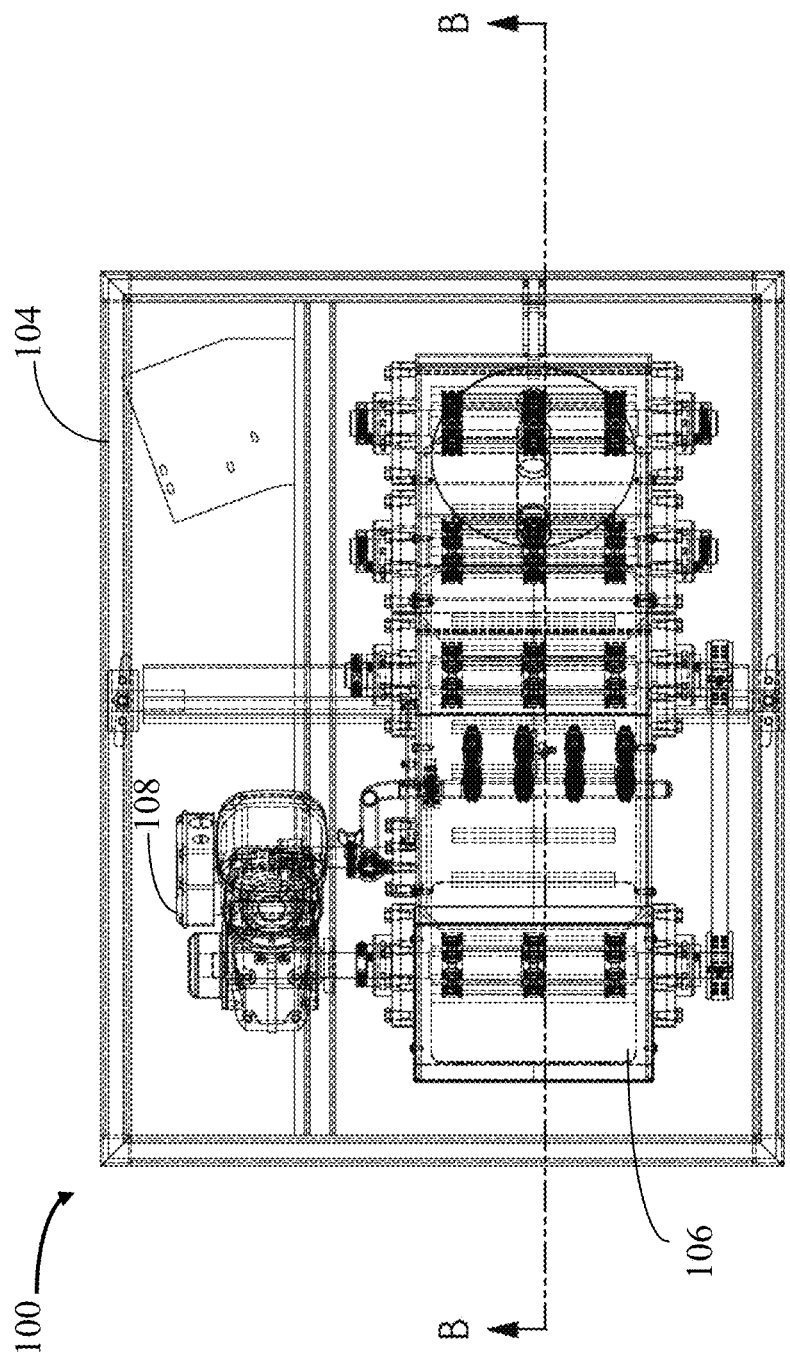
FIG. 2 is a top, partially hidden view of the conveyor system of FIG. 1.
Figure 3:
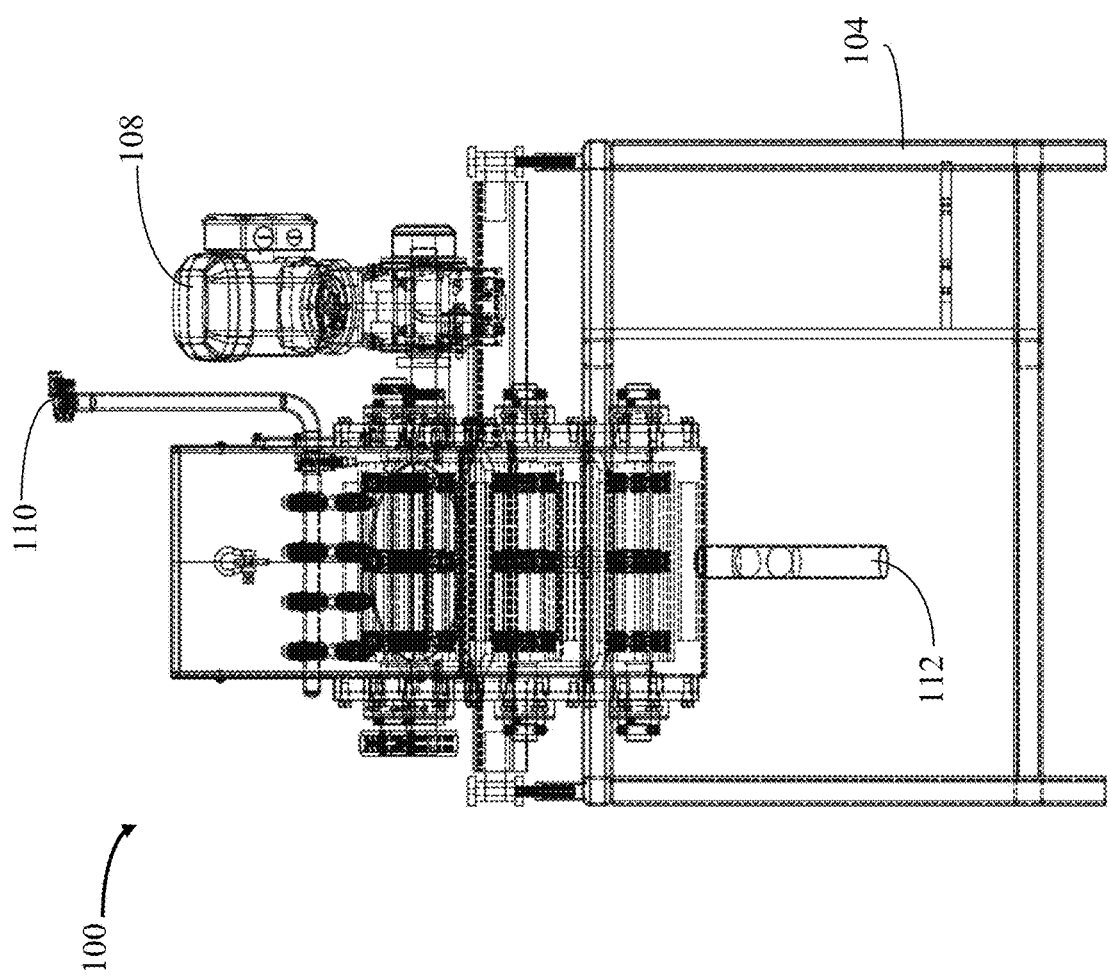
FIG. 3 is a partially hidden, end view of the conveyor system of FIG. 1.
Figure 4:
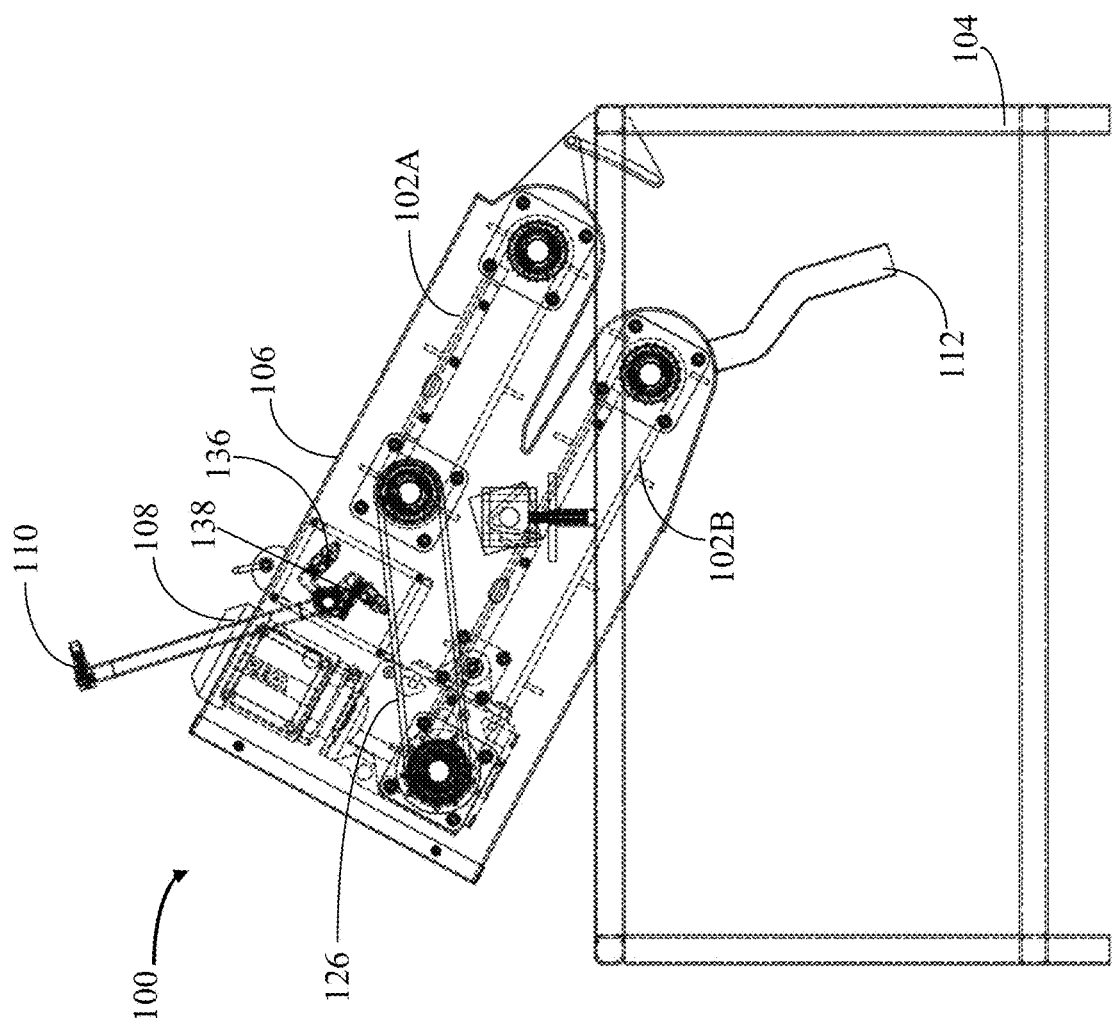
FIG. 4 is a partially hidden, side view of the conveyor system of FIG. 1.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

As illustrated in FIGS. 1-5, a conveyor system 100 according to an embodiment of the present invention can comprise at least two conveyor assemblies 102A, 102B that are used to sequentially present differing sides of a food material to a chemical intervention system. Representative food materials can comprise protein sources such as, for example, whole or partial carcasses or cuts of chicken, pork, beef, lamb, fish and other seafood, as well as eggs and nuts. Other representative food materials can comprise product such as fruits and vegetables.

With reference to FIGS. 1-5, the conveyor system 100 can be mounted to a skid or frame 104 to which a housing 106 is mounted. The housing 106 can include a motor assembly 108, shown as an exterior mounted motor assembly but can also be encompassed within the housing 106, an intervention chemical inlet 110 and a drain outlet 112. Generally, the various components of conveyor system 100 are to be manufactured of materials suitable for food contact and that are compatible with routine cleaning and sanitization. Housing 106 can further include a food inlet 114 and a food outlet 116. Food inlet 114 and food outlet 116 can be configured so as to successfully interface with conventional upstream and downstream food processing systems.

Figure 5:
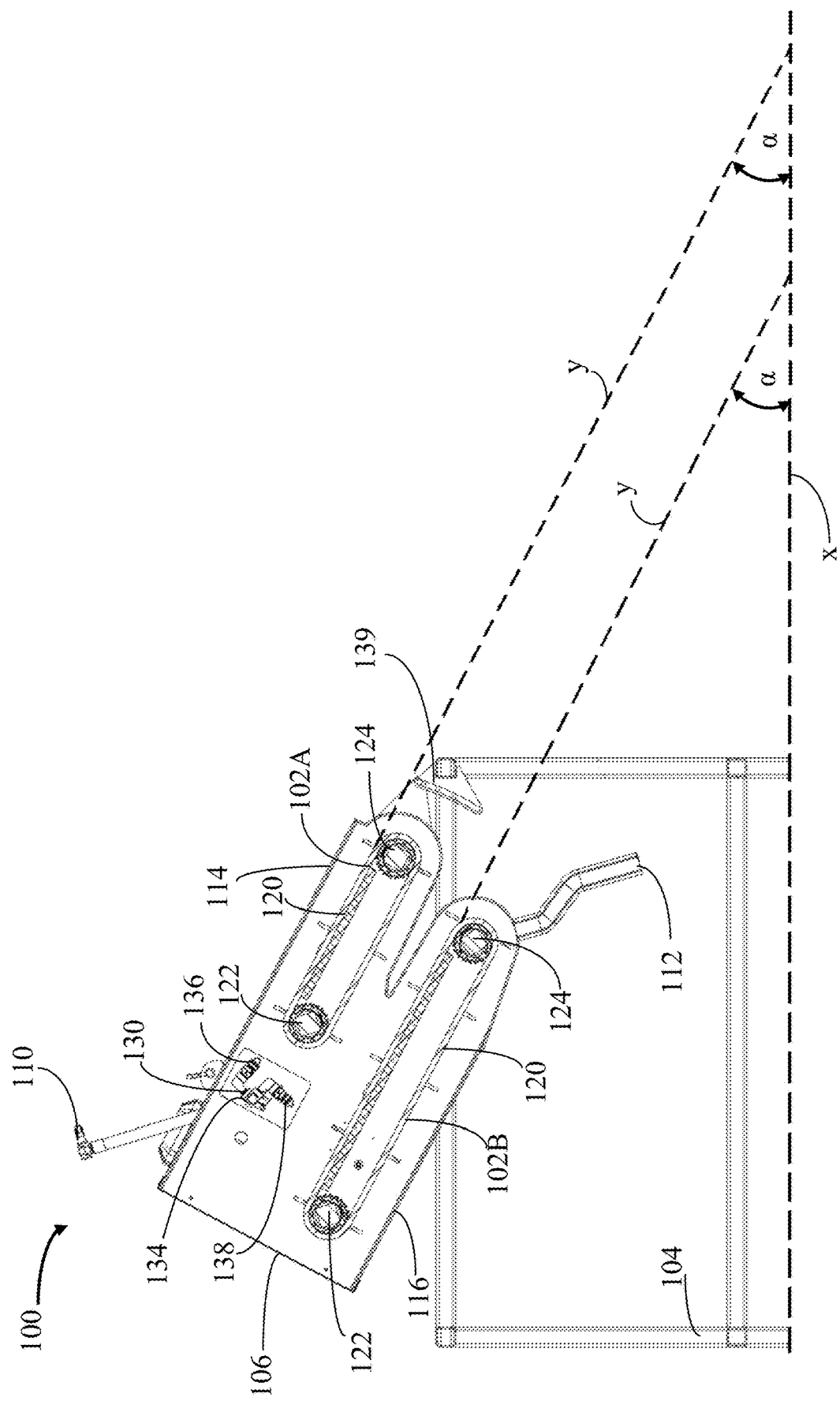
FIG. 5 is a section view of the conveyor system of FIG. 1 taken at line B-B of FIG. 2.

Generally, the motor assembly 108 is used to drive conveyor assemblies 102A, 102B located within the housing 106. The conveyor assemblies 102A, 102B each comprise a conveyor belt 120 operably wrapped about a drive sprocket 122 and an end sprocket 124, as shown in FIG. 5. A shared drive belt 126 can operably connect the drive sprocket 122 of conveyor assembly 102A to the drive sprocket 122 of conveyor assembly 102B. Alternatively, each of conveyor assemblies 102A, 102B can be driven using separate drive belts. In some embodiments, the conveyor assemblies 102A, 102B can operate at the same speed. Alternatively, conveyor assembly 102B can include a gear assembly within its drive sprocket 122 that allows for conveyor assembly 102B to operate at a faster rate than the conveyor assembly 102A.

Within the housing 106, the intervention chemical inlet 110 can be fluidly connected to an intervention chemical system 130 for applying an intervention chemical solution 132. In some embodiments, the interventional chemical system 130 can comprise a chemical manifold 134 that is fluidly connected to at least a first chemical sprayer 136 and a second chemical sprayer 138. The first chemical sprayer 136 can comprise one or more spray nozzles that are oriented to spray a food item on first conveyor assembly 102A, while the second chemical sprayer 138 can comprise one or more spray nozzles that are oriented to spray a food item on second conveyor assembly 102B.

Intervention chemical system 130 can be used to expose food items to desirable food chemistries. Representative intervention chemical solutions can comprise solutions of chlorine, bromine, cetylpyridinium chloride (CPC), an organic acid, a peroxycarboxylic acid, trisodium phospate, acidified sodium chlorite, and chlorine dioxide.

In some preferred embodiments, the intervention chemical solution 132 comprises at least one peroxycarboxylic acid having 2-18 carbon atoms. In some aspects, the peroxycarboxylic acid solution is chosen from peroxyformic acid, peroxypropionic acid, peroxyacetic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, peroxydodecanoic acid, peroxylactic acid, peroxymaleic acid, peroxyascorbic acid, peroxyhydroxyacetic acid, peroxyoxalic acid, peroxymalonic acid, peroxysuccinic acid, peroxyglutaric acid, peroxyadipic acid, peroxypimelic acid, peroxysubric acid, and mixtures thereof. In some aspects, the intervention chemical solution 132 comprises an equilibrium peroxycarboxylic acid or a pH modified peroxycarboxylic acid.

In some aspects, the equilibrium peroxycarboxylic acid preferably has a pH above about 3.0 and below about 7.0, in some aspects about 3.5 to about 5.5, and in some other aspects about 3.5 to about 5.0, although subranges within these ranges is contemplated. In some aspects, the equilibrium peroxycarboxylic acid preferably comprises peroxyacetic acid. In some aspects, the equilibrium peroxycarboxylic acid preferably comprises peroxylactic acid. In some aspects, the equilibrium peroxycarboxylic acid preferably comprises peroxylactic acid and peroxypropionic acid.

In some aspects, the pH modified peroxycarboxylic acid preferably has a pH above about 7.0 and below about 10.0, in certain aspects a pH range of about 7.0 to about 9.5, and in some other aspects a pH range of about 7.5 to about 9.0, although subranges within these ranges is contemplated. The pH modified peroxycarboxylic acid can be prepared by combining a peroxycarboxylic acid solution, such as a peroxyacetic acid solution, with one or more buffering agents chosen from sodium hydroxide, potassium hydroxide, the sodium salt of carbonic acid, the potassium salt of carbonic acid, phosphoric acid, silicic acid or mixtures thereof, in a quantity that is necessary to bring the solution to said pH range. One of ordinary skill in the art will appreciate that other alkalizing chemistries approved for direct food contact may also be used, whether alone or in combination with any of the foregoing buffering agents. The quantity of the buffering agent in a buffered peroxycarboxylic acid solution will generally be in the range of about 0.01% to about 10% by volume of the total solution, but other volumes of the buffering agent may be utilized depending upon various parameters, such as local water condition, including pH, hardness and conductivity. In some aspects, the pH modified peroxycarboxylic acid preferably comprises peroxyacetic acid. In some aspects, the pH modified peroxycarboxylic acid preferably comprises peroxylactic acid. In some aspects, the pH modified peroxycarboxylic acid preferably comprises peroxylactic acid and peroxypropionic acid.

Generally speaking, each of the conveyor systems 102A, 102B will be arranged in an angled relationship to a horizontal plane as defined by the ground or floor as illustrated as "x" in FIG. 5. An operational plane, illustrated as "y" in FIG. 5, generally intersects the horizontal plane "x" to define an operational angle "α". Preferably, operational angle "α" will be within a range of about 20 degrees to about 45 degrees. Preferably, the conveyor systems 102A, 102B are operably mounted within the housing 106 such that the operational angle "α" can be adjusted to optimize performance of the intervention chemical system 130. In some aspects, the operational angle "α" of conveyor systems 102A, 102B can be adjusted by a means for adjustment 139.

Variables that might impact performance could include food type, food size, food shape, the selected intervention chemical solution 132 and the desired throughput of the conveyor system 100. In some embodiments, the conveyor systems 102A, 102B can be arranged so as to have the same operational angle "α" so as to operate in parallel. Alternatively, the conveyor systems 102A, 102B can each have a different operational angle "α".

Figure 6:
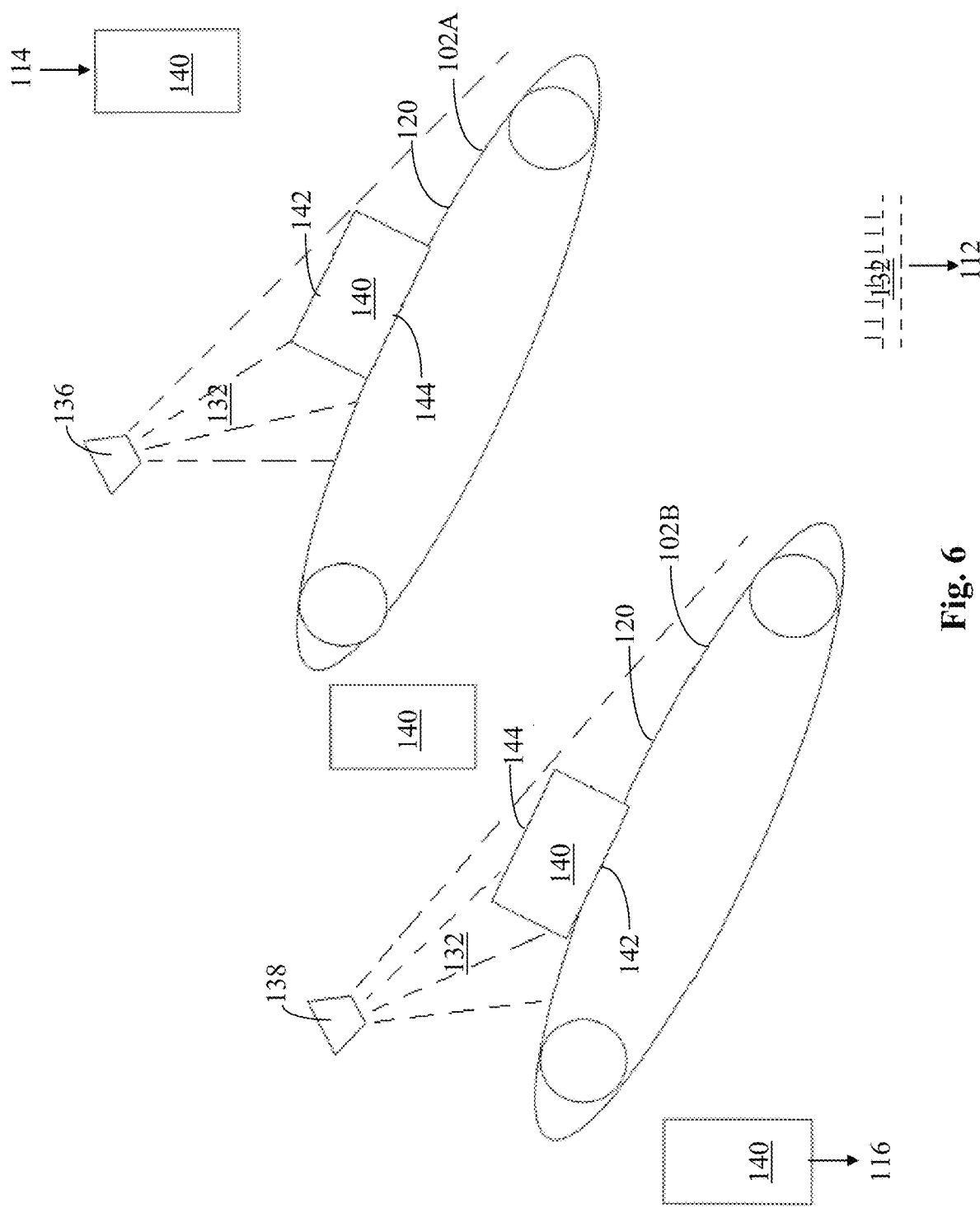
FIG. 6 is a side partial view of a pair of conveyor assemblies illustrating operation of the conveyor system of FIG. 1.

Generally, a food item 140, which shall be described herein for illustrative purposes as a cut of meat but shall be understood to apply to other food items, is introduced into the housing 106 through the food inlet 114 as illustrated in FIG. 6. The cut of meat 140 is generally positioned or "dropped" through the food inlet 114 so as to reside on the conveyor belt 120 of the conveyor assembly 102A. When the cut of meat 140 resides on the conveyor assembly 102A, a first side 142 of the cut of meat 140 is upwardly facing. As the cut of meat 140 moves along the conveyor assembly 102A, at least a first side 142 is sprayed with the intervention chemical solution 132 from the first chemical sprayer 136. As shown in FIG. 6, the cut of meat 140 is dropped through the food inlet 114 and onto the conveyor assembly 102A in a position located downstream from the intervention chemical solution 132, such that the cut of meat 140 moves towards the first chemical sprayer 136 during normal operation. In some other aspects, the first chemical sprayer 136 may be configured such that the cut of meat 140 moves away from the first chemical sprayer 136 during normal operation. In other aspects, the cut of meat may be sprayed by more than one chemical sprayer during normal operation while on the first conveyor assembly 102A.

As the cut of meat 140 reaches the end of the first conveyor assembly 102A, the cut of meat 140 is transferred from the first conveyor assembly 102A to the second conveyor assembly 102B. In some aspects, the cut of meat 140 falls from the first conveyor assembly 102A and subsequently lands on the conveyor belt 120 of the second conveyor assembly 102B. As the cut of meat 140 falls, the cut of meat "flips" such that a second side 144 of the cut of meat 140 is upwardly facing with the previously exposed first side 142 in contact with the conveyor belt 120 of conveyor assembly 102B. As the cut of meat 140 moves along the second conveyor assembly 102B, the second side 144 is sprayed with the intervention chemical solution 132 from the second chemical sprayer 138. As the cut of meat 140 reaches the end of the second conveyor assembly 102B, the cut of meat 140 falls off the conveyor assembly 102B and through the food outlet 116 for further processing. In this way, the first side 142 and second side 144 of the cut of meat 140 are each sequentially exposed and treated with the intervention chemical solution 132 as the cut of meat 140 travels between the food inlet 114 and food outlet 116. Residual intervention chemical solution 132 and anything rinsed from the cut of meat 140 is recovered and drained through the drain outlet 112 for disposal, recycle, reclaiming or reuse in the same operation or other food processing operations.

As shown in FIG. 6, the cut of meat 140 is dropped from the first conveyor assembly 102A onto the second conveyor assembly 102A in a position located downstream from the intervention chemical solution 132, such that the cut of meat 140 moves towards the second chemical sprayer 136 during normal operation. In some other aspects, the second chemical sprayer 138 may be configured such that the cut of meat 140 moves away from the second chemical sprayer 138 during normal operation. In other aspects, the cut of meat may be sprayed by more than one chemical sprayer during normal operation while on the second conveyor assembly 102B.

Since many variations and modifications of the present invention can be made without departing from the spirit and scope of the present invention, which the above discussion, examples and data illustrate, it is intended that the present invention be construed as including all such modifications and alterations insofar as they come within the scope of the appended claims or the equivalents thereof.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A food processing apparatus comprising:
   a housing mounted to a frame by at least one adjustable mount, wherein the housing comprises a food inlet and a food outlet;
   an intervention chemical inlet in fluid communication with a chemical manifold located within the housing, wherein the chemical manifold is in fluid communication with a first spray assembly and a second spray assembly located within the housing;

a first conveyor assembly located within the housing having a first conveyor configured to receive and convey a food item away from the food inlet, wherein the first spray assembly is proximately located the first conveyor assembly and configured to spray a chemical intervention solution on a first side of the food item while the food item is located on the first conveyor and being conveyed away from the food inlet and towards the first spray assembly during normal operation;

a second conveyor assembly located within the housing having a second conveyor configured to receive the food item from the first conveyor and convey the food item towards the food outlet, wherein the second spray assembly is proximately located the second conveyor assembly and configured to spray the chemical intervention solution on a second side of the food item while the food item is located on the second conveyor and being conveyed both toward the second spray assembly and away from the second spray assembly during normal operation;

wherein the first and second conveyor assemblies are each arranged at an operational angle of about 20 degrees to about 45 degrees relative to a common horizontal plane, wherein the operational angle is capable of being adjusted to between about 20 degrees and about 45 degrees relative to a common horizontal plane by the at least one adjustable mount between the housing and the frame; and wherein at least a portion of the second conveyor assembly is configured to be located below the first conveyor assembly such that the food item can transfer from the first side to the second side as the food item moves from the first conveyor to the second conveyor.

2. The food processing apparatus of claim 1, further comprising a motor assembly, wherein the motor assembly is configured to drive the first and second conveyors during normal operation.

3. The food processing apparatus of claim 2, wherein the motor assembly is mounted to an exterior of the housing.

4. The food processing apparatus of claim 2, further comprising at least one drive belt configured to drive the first conveyor.

5. The food processing apparatus of claim 2, further comprising a shared drive belt configured to drive the first and second conveyors.

6. The food processing apparatus of claim 5, wherein the second conveyor is configured to operate at a different speed than the first conveyor.

7. The food processing apparatus of claim 1, wherein the first spray assembly comprises at least one spray nozzle.

8. The food processing apparatus of claim 7, wherein the second spray assembly comprises at least one spray nozzle.

9. The food processing apparatus of claim 8, wherein the intervention chemical solution inlet is in fluid communication with the first and second spray assemblies.

10. The food processing apparatus of claim 1, wherein the adjustable mount for adjusting the operational angle is proximately located the food inlet end of the housing.

11. The food processing apparatus of claim 1, further comprising a drain outlet.

12. The food processing apparatus of claim 1, wherein the food inlet is located at a proximate end of the housing, the food outlet is located at a distal end of the housing, and the food inlet is located in a plane that is above the food outlet.

13. The food processing apparatus of claim 12, wherein the food inlet is located above at least a portion of the first conveyor assembly.

14. The food processing apparatus of claim 13, wherein the food outlet is located below at least a portion of the second conveyor assembly.

15. The food processing apparatus of claim 1, wherein the first and second conveyors are substantially in a parallel relationship during normal operation.

16. The food processing apparatus of claim 1, wherein the first spray assembly comprises at least one spray nozzle proximately located above and at a discharge end of the first conveyor.

17. The food processing apparatus of claim 15, wherein the second spray assembly comprises at least one spray nozzle proximately located above the second conveyor, and wherein the second conveyor is located between the at least one spray nozzle of the second spray assembly and the food outlet.

18. The food processing apparatus of claim 1, wherein the chemical intervention inlet is capable of providing a chemical intervention solution to the chemical manifold.

19. The food processing apparatus of claim 17, wherein the chemical intervention solution comprises at least one peroxycarboxylic acid having 2-18 carbon atoms chosen from peroxyformic acid, peroxypropionic acid, peroxyacetic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, peroxydodecanoic acid, peroxylactic acid, peroxymaleic acid, peroxyascorbic acid, peroxyhydroxyacetic acid, peroxyoxalic acid, peroxymalonic acid, peroxysuccinic acid, peroxyglutaric acid, peroxyadipic acid, peroxypimelic acid, peroxysubric acid, and mixtures thereof.

20. The food processing apparatus of claim 19, wherein the at least one peroxycarboxylic acid is a pH modified peroxycarboxylic acid having a pH above about 7.0 and below about 10.0.

* * * * *